(Model.)
P. E. PEREZ.
GAS METER.
No. 268,929. Patented Dec. 12, 1882.
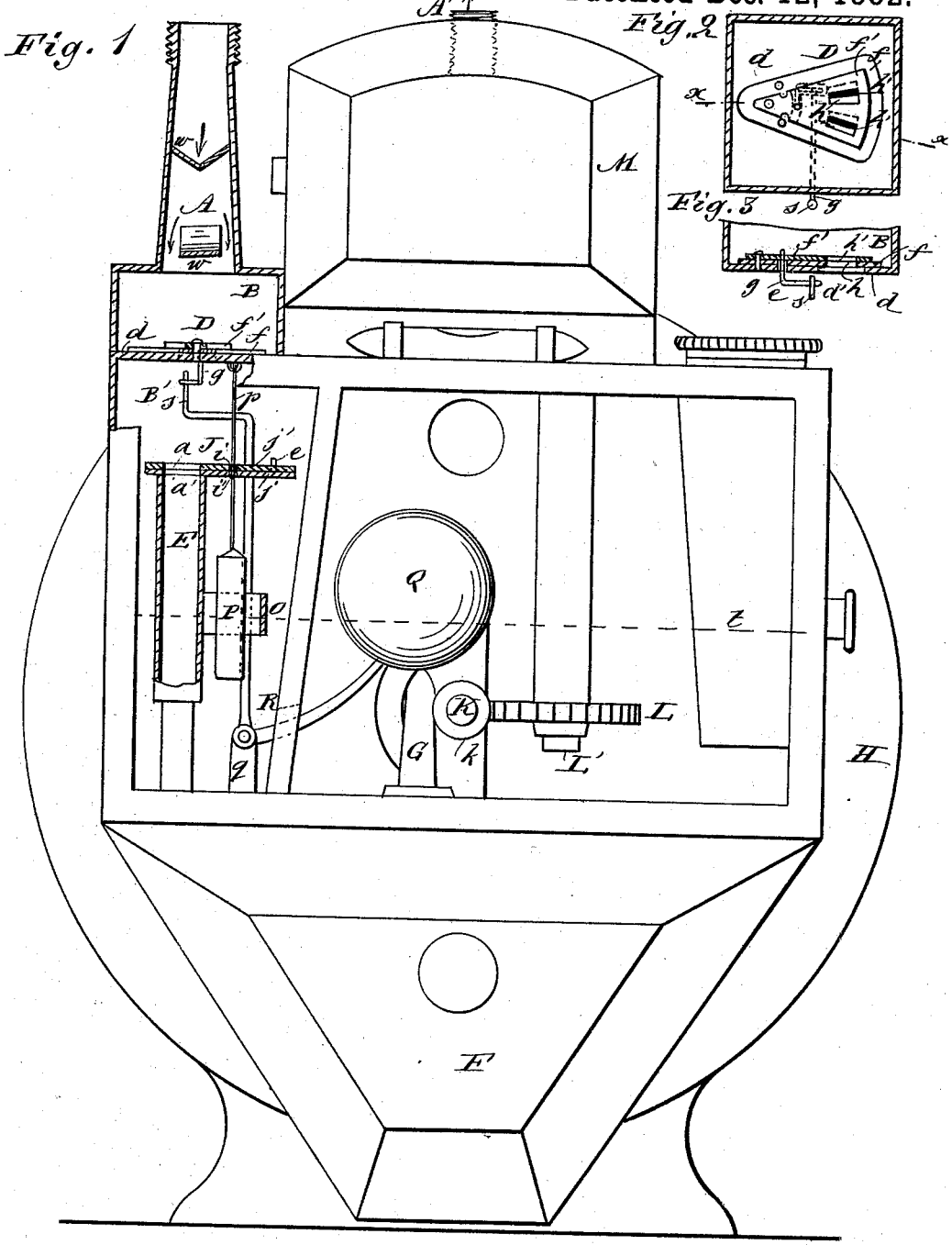
WITNESSES:
C. Neveux
E. Sedgwick
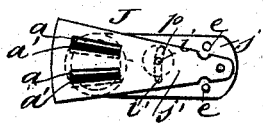
INVENTOR:
P. E. Perez
BY Munn & Co
ATTORNEYS.

UNITED STATES PATENT OFFICE.

PEDRO ENRIQUE PEREZ, OF VALPARAISO, CHILI.

GAS-METER.

SPECIFICATION forming part of Letters Patent No. 268,929, dated December 12, 1882.

Application filed June 21, 1882. (Model.)

*To all whom it may concern:*

Be it known that I, PEDRO ENRIQUE PEREZ, of Valparaiso, Chili, have invented certain new and useful Improvements in Gas-Meters, of which the following is a full, clear, and exact description.

My invention relates to water sealed gas-meters. These meters, as ordinarily constructed, if tipped out of level, will not register all of the gas that passes through them.

My invention consists in providing such meters with valves that will cut off the flow of gas if the meter should be tipped out of level in any direction. To accomplish this I employ two valves placed horizontally and at right angles to each other, one being operated by a float the other by a pendulum-weight or plumb. The valves are by preference made double acting.

Reference is to be had to the accompanying drawings, forming part of this specification, in which similar letters of reference indicate corresponding parts in all the figures.

Figure 1 is a front sectional elevation of a water-sealed gas-meter made in accordance with my invention. Fig. 2 is a detailed sectional plan view, showing the upper valve. Fig. 3 is a sectional elevation taken on the line $x\ x$ of Fig. 2; and Fig. 4 is a plan view of the lower valve.

A represents the gas-supply pipe, through which the gas enters the meter. This pipe communicates directly with the small primary chamber B. This chamber is divided from the secondary chamber B' by the horizontal partition $d$, to which is attached the upper double-acting valves, D. When the meter is set level and in working condition the gas passes from the primary chamber B through the said valve D to the secondary chamber B'. From this latter chamber it passes through the meter-pipe E to the chamber F, from which it emerges through the pipe G, which is set so that the current of gas will impinge against the vanes of the wheel contained in the circular chamber H. This current causes the wheel to revolve in the ordinary way. K is the shaft of this wheel, which is formed with the worm $k$, which meshes with the cogs of the wheel L, secured to the lower end of the vertical shaft L'. To the upper end of this shaft is attached suitable gearing, which communicates in the ordinary manner the motion of the shaft to the ordinary clock-work contained in the chamber M for registering the gas. After the gas passes the wheel it leaves the meter through the outlet-pipe A'.

Upon the upper end of the meter-pipe E is placed the lower double-acting valve, J. This valve is formed of the slotted plate $j$, which is secured to the upper end of the pipe E, and the slotted plate $j'$, pivoted upon the plate $j$, and is operated by the pendulum-weight P, the suspending rod or wire $p$ of which is attached to the under side of the plate $d$ above, and passes down through the orifice $i$ in the plate $j'$ and the slot $i'$ of the plate $j$.

$a\ a$ represent the slots in the plate $j'$, and $a'\ a'$ the corresponding slots through the plate $j$. These slots coincide when the valve is open, but will be cut off or closed if the plate $j'$ be moved upon its pivot in either direction. The weight P is so arranged or suspended relatively to the position of the slots in the plates $j$ and $j'$ that when the meter stands level the plate $j'$ will be held by the rod or wire $p$, so that the slots in the plates will stand open, but will move the plate $j$, so as to close the valve if the meter be tipped either forward or backward out of perpendicular.

$e\ e$ represent stop-pins, secured in the plate $j$ to prevent the plate $j'$ being moved too far by any deflection of the weight P; and O represents a fender or guard placed around the weight to prevent it getting out of place and from swinging too far.

The valve D is placed upon the partition $d$, as above stated, and at about right angles to the valve J, and is similar in construction to the valve J. It is formed of the slotted plate $f$, which is secured to the partition $d$ over the slot or passage $d'$, (shown in Fig. 3,) and the correspondingly-slotted plate, $f'$, pivoted upon the plate $f$. When the valve is open the slots $h'\ h'$ of the plate $f'$ coincide with the slots $h\ h$ of the plate $f$, and the latter will be closed by the solid parts of the plate $f'$ when the same is moved upon its pivot in either direction, the same as with the valve J. The plate $f'$ is operated by the ordinary float, Q, which rests in a body of water in the meter.

The dotted line $t$ in Fig. 1 indicates the height at which the water will be maintained in the meter. The float is connected with the plate $f'$ by means of the bell-crank lever R, pivoted in the uprights $g$ $g$ at the bottom of the meter, and the bent rod $g$, which is attached at one end to the under side of the plate $f'$ and passes down through the slot $l$ in the plate $f$ and partition $d$, and attached at the other end to the upturned end $s$ of the bell-crank lever R, as clearly shown in Fig. 1. These parts are so arranged that when the meter is supplied with the proper amount of water—that is, when it is full up to the dotted line $t$—and the meter stands level the float will hold the valve D open, but will close the valve if the level of the water is disturbed by tipping the meter in either direction sidewise. By this construction it will be seen that if the meter should be tipped out of level sidewise the flow of gas will be cut off in the chamber B by the valve D, and if tipped out of level backward or forward the flow will be cut off at the pipe B by the valve J, thus preventing all danger of the consumer meddling with the meter to the detriment of the producing company; and it will also be seen that the flow of gas will be checked or prevented if the water-line gets too low or too high, and that if the meter or the water-level is disturbed but slightly the gas will be cut off in proportion to the variation.

I do not confine myself to the particular form of valves shown and described, nor to the means described for operating them, as changes might be made in either and not depart from the spirit of my invention.

To obviate all danger of the valves being interfered with by the removal of the service pipe from the pipe A and the insertion of a wire or rod into the pipe A, I provide this pipe with the obstruction-plates $w$ $w$. These plates are preferably made trough-shaped, and are of a width equal to the diameter of the pipe, but are of a length somewhat less than the diameter of the pipe, and they are soldered or otherwise secured in the pipe at right angles to each other, as shown in Fig. 1. Thus formed and secured, the plates do not interfere with the flow of gas through the pipe, but afford perfect obstruction to the insertion of any object—like a wire, rod, or stick—calculated to lock or injure the free action of the valves.

Having thus fully described my invention, I claim as new and desire to secure by Letters Patent—

1. The combination, with the inlet-pipe to a gas-meter, of two admission-chambers interposed between said pipe and the meter, said chambers being separated by a partition provided with a valve operated by a float in the water-chamber, to close when the water is too low or out of level, and the inner chamber communicating with the meter by a pipe provided with a valve operated by a pendulum, to close when the meter is out of level in the direction of the pendulum's oscillation, as shown and described.

2. The combination, with the inlet-pipe to a gas-meter and a valve for closing the same, of a pendulum arranged to close the valve by swinging either way in its plane of motion from a perpendicular to the proper level of the meter, as shown and described.

3. The combination, with the inlet-pipe to a gas meter and a valve for closing the same, of a pendulum arranged to close said valve in proportion as the pendulum swings either way from a given point by the action of tipping the meter out of level either way in the direction of the pendulum's arc of motion, as shown and described.

4. The combination, with the inlet-pipes A E, of the pivoted slide-valve J and the pendulum P, pivoted at $g$, and operating midway of its rod through a hole, $i$, in the valve J, to oscillate said valve upon its pivot and close the pipe E by swinging either way from a given point, as shown and described.

5. The combination, with the oscillating slide-valve D, the partition $d$, and pipe A, of the float Q in the water-chamber of the meter, the bell-crank lever R, pivoted in the posts $q$, and the bent rod attached to valve D, communicating motion from the float Q to the valve D, to slide it across the opening in partition $d$ whenever the float rises or falls, as shown and described.

6. In a water-sealed gas-meter, the partition $d$, provided with the double-acting valve D, and the pipe E, provided with the double-acting valve J, in combination with the pendulum-weight or plumb P, float Q, and bell-crank lever R, substantially as and for the purposes described.

PEDRO ENRIQUE PEREZ.

Witnesses:
EDGAR TATE,
C. SEDGWICK.